United States Patent

Matsuoka et al.

(10) Patent No.: US 7,384,469 B2
(45) Date of Patent: Jun. 10, 2008

(54) POROUS ELASTIC PAVEMENT MATERIAL

(75) Inventors: Koki Matsuoka, Komaki (JP); Toshiaki Imaeda, Komaki (JP)

(73) Assignee: Tokai Rubber Industries, Ltd., Aichi-ken (JP)

(*) Notice: Subject to any disclaimer, the term of this patent is extended or adjusted under 35 U.S.C. 154(b) by 46 days.

(21) Appl. No.: 11/387,730

(22) Filed: Mar. 24, 2006

(65) Prior Publication Data

US 2006/0217466 A1    Sep. 28, 2006

(30) Foreign Application Priority Data

Mar. 24, 2005    (JP)    .............................. 2005-086143

(51) Int. Cl.
C09D 195/00    (2006.01)
C09D 117/00    (2006.01)
(52) U.S. Cl. .................. 106/284.01; 106/282; 524/81; 524/442; 524/293
(58) Field of Classification Search ................ 106/282, 106/284.01; 524/81, 442, 493
See application file for complete search history.

(56) References Cited

U.S. PATENT DOCUMENTS 2,863,841 A    12/1958 Bernier et al.

FOREIGN PATENT DOCUMENTS

| EP | 0 957 203 A2 | 11/1999 |
| EP | 1 052 333 A1 | 11/2000 |
| JP | 11-323806 A | 11/1999 |
| JP | 2005-2640 | 1/2005 |
| JP | 2005-002640 A | 1/2005 |

OTHER PUBLICATIONS

Extended European Search Report dated (Jun. 5, 2007) issued in European Application No. 06005911.0.

*Primary Examiner*—David M Brunsman
(74) *Attorney, Agent, or Firm*—Westerman, Hattori, Daniels & Adrian, LLP.

(57) ABSTRACT

A porous elastic pavement material is provided which is excellent in noise reducing effect and yet sustainably has a wet state slip resistance for a long period of time. The porous elastic pavement material comprises elastic aggregates (1), hard aggregates (2) and a binder (3) which binds the elastic aggregates (1) and the hard aggregates (2), wherein the hard aggregates (2) have an average particle diameter of 0.2 to 2 mm, and are present in a proportion of 25 to 65 vol % based on the elastic aggregates (1).

6 Claims, 2 Drawing Sheets

POROUS ELASTIC PAVEMENT MATERIAL

BACKGROUND OF THE INVENTION

1. Field of the Invention

The present invention relates to a porous elastic pavement material to be used for formation of an elastic pavement layer on a driveway or the like on which motor vehicles travel.

2. Description of the Related Art

For pavements such as driveways, footways and walkways in golf courses, elastic pavement materials are conventionally used for improvement of the shock absorbing property of road surfaces. Such an elastic pavement material typically includes granular rubber chips prepared by crushing waste tires, hard aggregates and a binder such as a urethane resin or an epoxy resin. The binder is present in the form of thin films on surfaces of the rubber chips, whereby the rubber chips are bound with one another or with the hard aggregates. Voids are present in the elastic pavement material. The voids and the elasticity of the rubber chips impart the elastic pavement material with a shock absorbing property and a noise reducing property. Particularly, where the elastic pavement material is used for the pavement of the driveway, the elasticity of the rubber chips suppresses impact sound and patterned vibration sound of vehicle tires generated by impacts occurring when the tires are brought into contact with the road surface. Further, air trapped between treads of the tires and the road surface is released through the voids, whereby noise such as air pumping sound of the tires generated during traveling of the motor vehicle is suppressed. Thus, traffic noise can be drastically reduced. In addition, the hard aggregates serve to cut a water film present between the tires and the surface of the elastic pavement layer when the road surface is wet in a rain, thereby effectively improving slip resistance in a wet state.

Fine hard aggregates are typically used as the hard aggregates in consideration of the elasticity and the noise reducing property of the pavement layer and the mixing compatibility with the binder. However, the fine hard aggregates distributed in the surface of the pavement layer are liable to be abraded away together with the binder, so that the rubber chips are partly exposed on the surface of the pavement layer. Therefore, the wet state slip resistance is reduced with time.

In order to sustain the effect of the hard aggregates for a prolonged period, an elastic pavement material is proposed which includes rubber chips containing hard aggregates dispersed therein (see, for example, JP-A-2005-2640).

However, a production process for the elastic pavement material disclosed in JP-A-2005-2640 is complicated with the need for preliminarily dispersing the hard aggregates in the rubber chips, thereby increasing the production costs.

In view of the foregoing, it is an object of the present invention to provide a porous elastic pavement material which is excellent in noise reducing effect and yet sustainably has a wet state slip resistance for a long period of time.

SUMMARY OF THE INVENTION

To achieve the aforesaid object, the inventive porous elastic pavement material comprises elastic aggregates, hard aggregates and a binder which binds the elastic aggregates and the hard aggregates, wherein the hard aggregates have an average particle diameter of 0.2 to 2 mm, and are present in a proportion of 25 to 65 vol % based on the elastic aggregates.

The inventors of the present invention conducted intensive studies on a porous elastic pavement material which is free from deterioration of the noise reducing effect and sustainably has a wet state slip resistance. In the course of investigation of the cause of the reduction in the wet state slip resistance, the inventors found that the hard aggregates are liable to be dislodged from the surfaces of the elastic aggregates (e.g., rubber chips) due to friction caused by the tires or the like so that the surface of the porous elastic pavement material is liable to be abraded due to the friction of the tires in the absence of the hard aggregates. Therefore, only the elastic aggregates are exposed on the surface of the pavement material, thereby failing to cut the water film. As a result, the wet state slip resistance is reduced to cause the skid of the tires. To cope with the problem, the inventors further conducted the studies and found that, where the hard aggregates having an average particle diameter of 0.2 to 2 mm are blended in a particular proportion of 25 to 65 vol % based on the elastic aggregates in the material, the wet state slip resistance can be sustained without deterioration of the noise reducing property. That is, even if the surface of the porous elastic pavement material is abraded due to the friction caused by the tires, the hard aggregates are constantly newly exposed between the elastic aggregates, making it possible to cut the water film. Thus, the inventors attained the present invention.

Even if the surface of the inventive porous elastic pavement material is abraded due to the friction caused by the tires, the hard aggregates having the particular range of average particle diameter are constantly exposed between the elastic aggregates, making it possible to cut the water film. Therefore, the wet state slip resistance is properly sustained for a longer period of time without deterioration of the noise reducing property.

Where the average particle diameter of the hard aggregates is 0.5 to 2 mm in the porous elastic pavement material, the wet state slip resistance is further improved.

Where the average particle diameter of the hard aggregates is not less than one fifth the average particle diameter of the elastic aggregates in the porous elastic pavement material, the wet state slip resistance is further improved.

Where the elastic aggregates each have an elongated shape in the porous elastic pavement material, the wet state slip resistance and the noise reducing property are further improved.

In the present invention, the concept of "particle diameter" for the hard aggregates is also applicable to the size of non-spherical hard aggregates such as polyhedral hard aggregates. Where the hard aggregates each have an elliptical cross section, for example, the particle diameter is herein defined as the length of the minor axis of the ellipse. Where the hard aggregates each have a cubic shape, the particle diameter is herein defined as a minimum distance between opposed faces of the cube. The "average particle diameter" of the hard aggregates is herein defined as an arithmetic average obtained by repeating at least ten times such a measuring operation that a hard aggregate is randomly sampled from a particular set of hard aggregates and the particle diameter of the sampled hard aggregate is measured, and averaging values in a 80% median range selected from the values of the measured particle diameters.

In the present invention, the "average particle diameter" or "average length" of the elastic aggregates are defined as an arithmetic average obtained by repeating at least ten times such a measuring operation that an elastic aggregate is randomly sampled from a particular set of elastic aggregates and the particle diameter or length of the sampled elastic aggregate is measured, and averaging values in a 80% median range selected from the values of the measured particle diameters or lengths. The definition of the "particle diameter" for the elastic aggregates conforms to the definition of the particle diameter for the hard aggregates. Where the elastic aggregates each have an elongated shape, the particle diameter is herein defined as the maximum diameter of a cross section taken perpendicularly to the longitudinal axis of the elongated elastic aggregate.

DETAILED DESCRIPTION OF PREFERRED EMBODIMENT

An embodiment of the present invention will hereinafter be described in detail.

Figure 1:
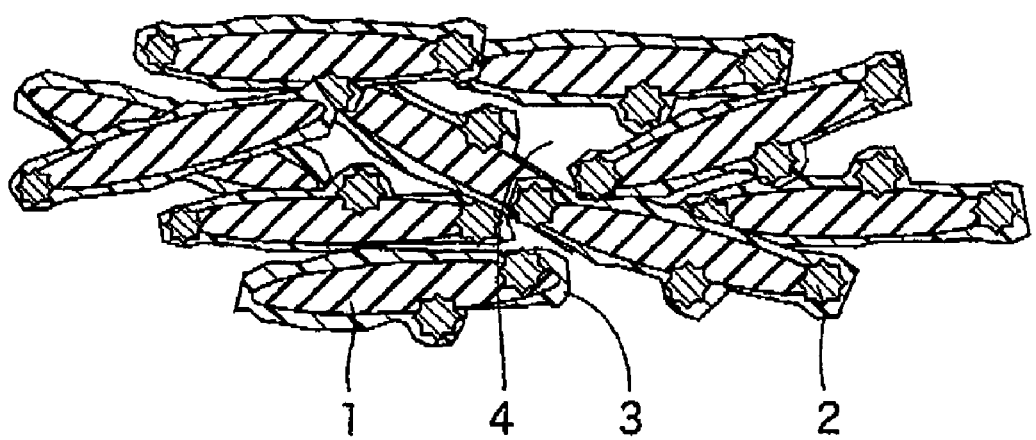
FIG. 1 is a schematic vertical sectional view illustrating a major portion of a porous elastic pavement material according to an embodiment of the present invention.

As shown in FIG. 1, a porous elastic pavement material according to the present invention includes elastic aggregates 1 and hard aggregates 2 which are bound with each other by a binder 3. Voids 4 are present in the porous elastic pavement material.

A material for the elastic aggregates 1 to be used for preparation of the inventive porous elastic pavement material is not particularly limited, but examples of the material include rubber materials such as natural rubber and synthetic rubbers. Exemplary elastic aggregates are rubber chips prepared in a granular or elongated shape by rolls or a rotary blade. Examples of the synthetic rubbers include styrene-butadiene rubber (SBR), acrylonitrile-butadiene rubber (NBR), ethylene-propylene-diene terpolymer (EPDM), butadiene rubber (BR), chloroprene rubber (CR) and elastomers, and blend rubbers prepared by blending any of these rubbers. Other exemplary elastic aggregates include foamed rubber chips and rubber chips prepared by mixing a resin and hard aggregates. These elastic aggregates may be used either alone or in combination. Among these elastic aggregates, rubber chips prepared from waste tires are preferred from the viewpoint of recycling of resources.

The size of the elastic aggregates 1 is not particularly limited, but the elastic aggregates 1 may have an ordinary size. The granular rubber chips are typically used as the elastic aggregates 1 and, particularly, granular rubber chips having an average particle diameter of 1 to 5 mm are preferably used. If the average particle diameter is smaller than 1 mm, the elastic aggregates have a smaller bulkiness, making it difficult to increase the void content. This may deteriorate the noise reducing property. Further, intervals of the voids are reduced, thereby reducing a draining property and clogging the pavement material. On the other hand, if the average particle diameter is greater than 5 mm, level differences of the elastic aggregates 1 are increased, so that greater tire vibration sound is generated from side walls of tires due to vertical vibrations of the tires. This may deteriorate the noise reducing property.

Where the elongated fiber-like rubber chips are used as the elastic aggregates 1, the size of the elastic aggregates 1 is not particularly limited. Particularly, the average maximum diameter of sections of the rubber chips taken perpendicularly to longitudinal axes of the rubber chips is preferably 0.5 to 2 mm. In this case, the noise reducing property and the wet state slip resistance are further improved.

A material for the hard aggregates 2 to be used together with the elastic aggregates 1 in the present invention is not particularly limited, as long as it is harder than the material for the elastic aggregates 1 and has sufficient compatibility with and adhesion to the binder 3. Examples of the material for the hard aggregates 2 include inorganic materials such as gravel, silica sand, silica and glass, and resin materials such as polyamide (PA), polyethylene terephthalate (PET), polyurethane, polyacryl and polyphenylene ether (PPE). The shape of the hard aggregates 2 is not particularly limited, but the hard aggregates 2 may each have a granular, pellet or fibrous shape. Particularly, the granular and pellet shapes are preferred, because the granular or pellet-shaped hard aggregates are properly inserted between the elastic aggregates 1. These hard aggregates may be used either alone or in combination.

Where the material for the hard aggregates 2 is poor in compatibility with or adhesion to the binder 3, the compatibility with or the adhesion to the binder 3 may be improved by surface-treating the hard aggregates 2. The surface treatment may be physically performed by roughening surfaces of the hard aggregates 2, or chemically performed by applying a silane coupling agent. Alternatively, the hard aggregates 2 may be mixed with the elastic aggregates 1 and the binder 3 after an adhesive is preliminarily applied to the surfaces of the hard aggregates 2.

The average particle size (diameter) of the hard aggregates 2 should be 0.2 to 2 mm in order to provide a sufficient slip preventing property. More preferably, the average particle diameter of the hard aggregates 2 is 0.5 to 2 mm. The average particle diameter of the hard aggregates 2 is preferably not less than one fifth, particularly preferably not less than one third, the average particle diameter of the elastic aggregates 1.

Figure 2:
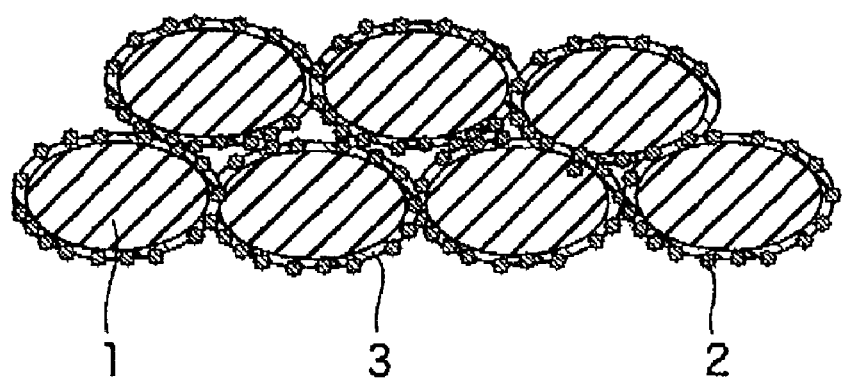
FIG. 2 is a schematic vertical sectional view of a porous elastic pavement material in which the average particle diameter of hard aggregates is less than one fifth the average particle diameter of elastic aggregates.
Figure 3:
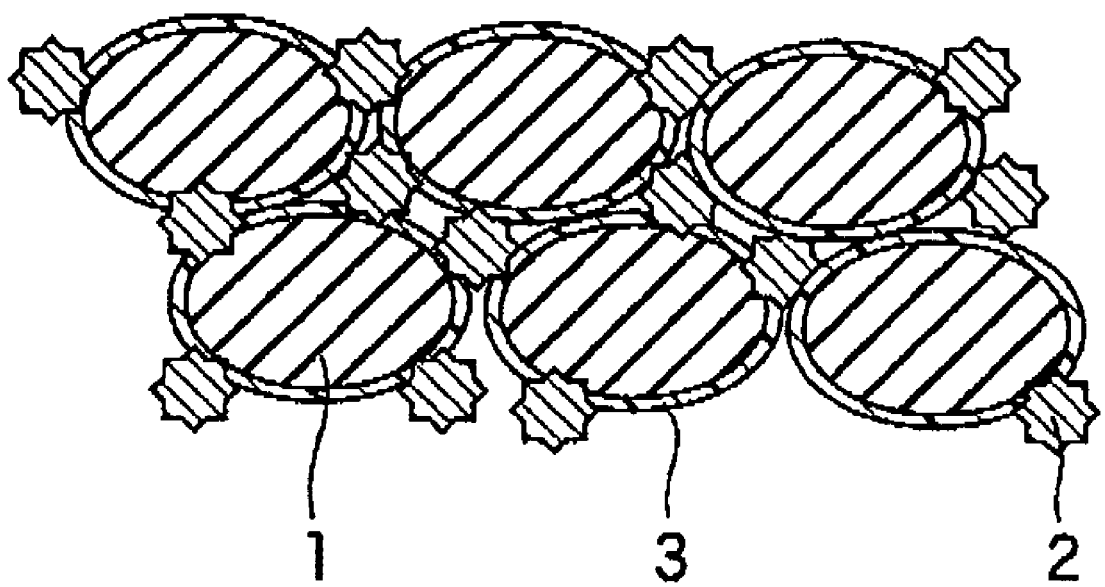
FIG. 3 is a schematic vertical sectional view of a porous elastic pavement material in which the average particle diameter of hard aggregates is not less than one fifth the average particle diameter of elastic aggregates.

If the average particle diameter of the hard aggregates 2 is less than one fifth the average particle diameter of the elastic aggregates 1 as shown in FIG. 2, the hard aggregates 2 are dredged over the elastic aggregates 1. Therefore, the hard aggregates 2 dredged over the elastic aggregates 1 are liable to be dislodged due to the friction caused by the tires. Although the hard aggregates 2 are newly exposed on the surface of the pavement material, the hard aggregates 2 tend to be displaced due to deformation of the elastic aggregates 1 in contact with the tires. The hard aggregates 2 are mostly each bonded to a single elastic aggregate 1 with a lower bonding strength and, hence, are liable to be dislodged due to the friction of the tires. This makes it difficult to cut a water film formed between the tires and a road surface, thereby deteriorating the slip resistance. In contrast, if the average particle diameter of the hard aggregates 2 is not less than one fifth the average particle diameter of the elastic aggregates 1 as shown in FIG. 3, the hard aggregates 2 are easily held between adjacent elastic aggregates 1. Therefore, even if the elastic aggregates 1 are deformed in contact with the tires, the hard aggregates 2 are not displaced, making it possible to cut the water film between the tires and the elastic aggregates 1. Since the hard aggregates 2 each adhere to two or more elastic aggregates 1, the hard aggregates 2 are less liable to be dislodged due to the friction of the tires. Thus, the slip resistance is sustained for a longer period of time.

If the average particle diameter of the hard aggregates 2 is greater than 2 mm, the number of hard aggregates 2 per unit area exposed on the surface of the porous elastic pavement material is reduced, thereby resulting in deterioration of the wet state slip resistance. Further, greater undulations are formed on the surface of the porous elastic pavement material by the elastic aggregates 1 and the hard aggregates 2, so that the tire vibration sound is increased to deteriorate the noise reducing property. If the average particle diameter of the hard aggregates 2 is smaller than 0.2 mm, the hard aggregates 2 are liable to enter the voids defined between the elastic aggregates 1, so that the noise reducing property and the elasticity of the resulting elastic pavement material are deteriorated. Therefore, the average particle diameter of the hard aggregates 2 should be 0.2 to 2 mm as described above.

The hard aggregates 2 are preferably granular, each having an elliptical spherical shape having an elliptical cross section, an elliptical cylindrical shape having a rectangular cross section or a polyhedral shape rather than a perfect spherical shape. In this case, the hard aggregates 2 each have a greater contact area with respect to the elastic aggregates 1 and, hence, are less liable to be dislodged. Further, the hard aggregates 2 each have a greater contact area with respect to the tires, thereby further improving the wet state slip resistance.

Where the elongated fiber-like rubber chips are used as the elastic aggregates 1, the voids each have a smaller size as compared with the case where the pellet-shaped rubber chips are used. Therefore, the bond areas of the elastic aggregates 1 with respect to the hard aggregates 2 are increased, so that the dislodgement of the hard aggregates due to the friction of the tires can be suppressed as compared with the case where the pellet-shaped rubber chips are used. Where the elongated fiber-like rubber chips are used as the elastic aggregates 1, the elastic aggregates 1 are liable to be oriented parallel to the surface of the elastic pavement material during compaction of the pavement material in a mold or during compaction of the pavement material by a trowel or a roller when the pavement material is laid and cured in a site. Therefore, the undulations of the surface of the pavement material are reduced, so that the noise reducing property can be advantageously improved as compared with the case where the pellet-shaped rubber chips are used.

The proportion of the hard aggregates 2 to be contained in the porous elastic pavement material should be in the range of 25 to 65 vol % based on the elastic aggregates 1. If the proportion of the hard aggregates 2 is less than 25 vol % based on the elastic aggregates 1, the number of hard aggregates 2 to be newly exposed on the outermost surface of the porous elastic pavement material when the hard aggregates 2 bonded to the elastic aggregates 1 are dislodged due to the friction of the tires is reduced, so that the wet state slip resistance is insufficient. On the other hand, if the proportion is greater than 65 vol %, the hardness of the surface of the resulting elastic pavement layer is increased, thereby deteriorating the effect of suppressing the tire vibration sound and the tire impact sound. Further, the strength of the porous elastic pavement material is reduced, and the elastic aggregates 1 are liable to be dislodged.

The binder 3 to be used together with the elastic aggregates 1 and the hard aggregates 2 is not particularly limited, but examples thereof include urethane resin, epoxy resin, bitumen and rubber, which may be used either alone or in combination. Among these binders, the urethane resin is particularly preferred from the viewpoint of flexibility (compliance to deformation) and adhesiveness.

Examples of the urethane resin include a urethane resin of single-liquid moisture-curable type, a urethane resin of two-liquid mixing type and a thermoplastic urethane resin.

The amount of the binder 3 to be blended is not particularly limited, but is preferably in the range of 5 to 50 vol %, particularly preferably 15 to 35 vol %, based on the total of the elastic aggregates 1 and the hard aggregates 2. If the blend amount of the binder 3 is less than 5 vol %, the strength of the porous elastic pavement material tends to be reduced. On the other hand, if the blend amount of the binder 3 is greater than 50 vol %, the workability and the operation efficiency tend to be deteriorated.

The inventive porous elastic pavement material is prepared, for example, in the following manner by using the elastic aggregates 1, the hard aggregates 2 and the binder 3 described above. First, the elastic aggregates 1, the hard aggregates 2 and the binder 3 are mixed in a predetermined ratio by means of a mixer, and then the resulting mixture is weighed so as to provide a predetermined void content. The mixture is charged in a mold and heat-treated under predetermined conditions (e.g., at 150° C. for 30 minutes) by a heat press, and the resulting product is demolded. Thus, a planar porous elastic pavement material (typically having a thickness of 20 to 50 mm) is produced. The molding method and the treatment conditions (the temperature, the period and the like) are not limited to those described above. The porous elastic pavement material may have a plural-layer structure including an outermost surface layer prepared by employing the elastic aggregates 1, the hard aggregates 2 and the binder 3, and an underlying layer prepared by employing only the elastic aggregates 1 and the binder 3. In this case, the outermost surface layer and the underlying layer may each have a proper thickness.

The planar porous elastic pavement material is laid on a road base such as of concrete or asphalt provided on a ground via an adhesive such as an epoxy-based adhesive or a urethane-based adhesive, thereby providing an intended elastic pavement layer. The laying method, the bonding method and the type of the adhesive to be used are not particularly limited.

The inventive porous elastic pavement material may be provided on an in-situ basis. More specifically, the elastic aggregates 1, the hard aggregates 2 and the binder 3 are mixed together. The resulting mixture is spread over the road base, and then compacted by a heat roller or the like. Alternatively, the porous elastic pavement material may be produced as having a plural-layer structure by forming an underlying layer from a mixture of the elastic aggregates 1 and the binder 3 and then forming an outermost surface layer from a mixture of the elastic aggregates 1, the hard aggregates 2 and the binder 3 on the underlying layer. In this case, the number of the layers and the thicknesses of the respective layers are not particularly limited.

The inventive porous elastic pavement material preferably has a void content of 30 to 50%, particularly preferably 35 to 45%. The void content is calculated from the following expression (1):

$$\text{Void content (\%)} = \left(1 - \frac{\text{Apparent density}}{\text{Theoretical density}}\right) \times 100 \quad (1)$$

wherein the apparent density and the theoretical density are defined as follows:

$$\text{Apparent density} = \frac{\text{Weight of elastic pavement material}}{\text{Apparent volume}}$$

$$\text{Theoretical density} = \frac{\text{Total weight of mixed ingredients}}{\substack{\text{Total volume of ingredients} \\ \text{calculated from densities of ingredients}}}$$

The inventive porous elastic pavement material thus produced has a feature such that, even if the surface thereof is abraded due to the friction caused by the tires, the hard aggregates 2 are constantly exposed on the abraded surface to make it possible to cut the water film. Therefore, the wet state slip resistance can be sustained to provide excellent durability. In addition, the proportion of the hard aggregates 2 is limited within the predetermined range of volume percentage based on the elastic aggregates 1, so that the noise reducing effect provided by the elastic aggregates 1 is not deteriorated.

The inventive porous elastic pavement material is applicable not only to the road pavement but also to pedestrian malls, athletic fields and the like.

EXAMPLES

Next, examples will be described in conjunction with comparative examples.

Example 1

First, 45 vol % of hard aggregates (CERASAND B available from Bishu Kosan Co., Ltd.) having an average particle diameter of 0.7 mm were blended with elongated fiber-like rubber chips (FIBER RUBBER 612 available from Misawa Toyo Co., Ltd) having an average length of 6 mm and an average maximum diameter of 1.0 mm, and 20 vol % of a single-liquid moisture-curable urethane binder (TAK-ENATE F181P available from Mitsui Takeda Chemical Inc.) was blended with a total of 100 vol % of the elongated fiber-like rubber chips and the hard aggregates with stirring. The resulting mixture was weighed so as to provide a post-molding void content of 40%, and charged in a mold. Then, the mixture was heat-compressed at 150° C. for 30 minutes. Thus, a planar porous elastic pavement material (400 mm×400 mm) having a thickness of 30 mm was produced.

Examples 2 to 6 and Comparative Examples 1 and 2

Seven types of porous elastic pavement materials were produced in substantially the same manner as in Example 1, except that hard aggregates of the same material as in Example 1 having different average particle diameters as shown in Tables 1 and 2 were used.

Examples 7 and 8 and Comparative Examples 3 and 4

Four types of porous elastic pavement materials were produced in substantially the same manner as in Example 1, except that the hard aggregates were blended in different proportions with the elongated fiber-like rubber chips as shown in Table 3.

Examples 9 and 10

Two types of porous elastic pavement materials were produced in substantially the same manner as in Example 1, except that longer elongated fiber-like rubber chips (FIBER RUBBER 306 available from Misawa Toyo Co., Ltd.) having an average length of 15 mm and an average maximum diameter of 1.8 mm were used in Example 9 and further longer elongated fiber-like rubber chips sieved out of the aforesaid elongated fiber-like rubber chips as having an average length of 25 mm and an average maximum diameter of 2.0 mm were used in Example 10 as shown in Table 4.

Examples 11 and 12

As shown in Table 5, smaller granular rubber chips (available from Muraoka Rubber Reclaiming Co., Ltd.) having an average particle diameter of 2.5 mm and larger granular rubber chips sieved out of the Muraoka Rubber's granular rubber chips as having an average particle diameter of 4.5 mm were prepared instead of the elongated fiber-like rubber chips. Then, 40 vol % of hard aggregates (SILICA SAND No. 4 available from Okumura Ceram Co., Ltd.) having an average particle diameter of 0.7 mm were blended with each type of the granular rubber chips, and 15 vol % of a single-liquid moisture-curable urethane binder (TAK-ENATE F181P available from Mitsui Takeda Chemical Inc.) was blended to a total of 100 vol % of the granular rubber chips and the hard aggregates with stirring. The resulting mixture was weighed so as to provide a post-molding void content of 37%, and charged in a mold. Then, the mixture was heat-compressed at 150° C. for 30 minutes. Thus, two types of planar porous elastic pavement materials (400 mm×400 mm) each having a thickness of 30 mm were produced.

The following measurements were performed on the porous elastic pavement materials of Examples and Comparative Examples, and the results are shown in Tables 1 to 5. Methods for the measurements will be described below.

Breakdown Strength

A 10-mm thick test strip was cut out of a surface portion of each of the porous elastic pavement materials, and the breakdown strength of the test strip was measured in conformity with JIS K 6251-1993. The test strip was of a dumbbell No. 1 shape, and the stretching rate was 100 mm/min. A pavement material having a breakdown strength of less than 0.5 MPa is unacceptable in practice.

Surface Hardness

The surface hardness of each of the porous elastic pavement materials was measured by means of ASKER CS durometer (available from Koubunshi Keiki Co., Ltd.). A pavement material having a hardness of 90 or higher has a poorer noise reducing property, suffering from greater tire impact sound and vibration sound.

Slip Resistance

While water was sprayed over a surface of each of the porous elastic pavement materials, the wet state slip friction coefficient (μwet) of the surface of the pavement material was measured at a speed of 60 km/h by means of a rotary slip resistance meter (DF tester available from Nippo Sangyo Co., Ltd.) in conformity with ASTM E1911-98. A value of the slip friction coefficient measured before the following durability test (exposure to xenon light) after the molding was defined as an initial value. For determination of the durability of each of the porous elastic pavement materials after prolonged use, the pavement material was treated in two different ways, and then the slip friction coefficient (μwet) of the pavement material was measured in the aforesaid manner. In a first way, a light aging test was first performed by means of a xenon weatherometer (available from Suga Tester Co., Ltd.) in simulation of outside use. In the light aging test, a cycle including 102-minute xenon light irradiation at a black panel temperature of 60° C. and 18-minute xenon light irradiation with water spraying was repeated for 200 hours in conformity with JIS K6266-1966. After the 200-hour light aging test, a tire with a load of $6 \times 10^5$ Pa was passed over the pavement material 480,000 times in simulation of passage of a heavy vehicle, and then the wet state slip friction coefficient (µwet) of the surface of the pavement material was measured. In a second way, the light aging test (xenon light irradiation) was performed in the aforesaid manner for 400 hours in simulation of outdoor use, and then a tire with a load of $6 \times 10^5$ Pa was passed over the pavement material 960,000 times in simulation of passage of a heavy vehicle, and then the wet state slip friction coefficient (µwet) of the surface of the pavement material was measured. A pavement material having a slip friction coefficient of 0.33 or higher at 60 km/h is considered to be capable of sufficiently preventing the skid of tires.

Abrasion Resistance

After the porous elastic pavement materials were each irradiated with xenon light for 400 hours in the same manner as in the light aging test in the evaluation of the slip resistance, a tire with a load of $6 \times 10^5$ Pa was passed over the pavement material 960,000 times in simulation of passage of a heavy vehicle. Then, the abraded state of the surface of the pavement material was visually inspected. A pavement material substantially free from dislodgement of the elastic aggregates and the hard aggregates was rated excellent (⊚), and a pavement material slightly suffering from the dislodgement was rated good (○). A pavement material apparently suffering from the dislodgement with no indentation was rated acceptable (Δ), and a pavement material apparently suffering from the dislodgement with thickness reduction was rated unacceptable (×).

TABLE 1

| | Example | | | |
|---|---|---|---|---|
| | 1 | 2 | 3 | 4 |
| Ingredients | | | | |
| Elastic aggregates A (Elongated fiber-like rubber chips) | | | | |
| Average length (mm) | 6 | 6 | 6 | 6 |
| Average particle diameter (mm) | 1.0 | 1.0 | 1.0 | 1.0 |
| Hard aggregates B | | | | |
| Average particle diameter (mm) | 0.7 | 0.2 | 0.5 | 1.0 |
| Volume % based on A | 45 | 45 | 45 | 45 |
| Binder | | | | |
| Volume % based on A + B | 20 | 20 | 20 | 20 |
| Void content (%) | 40 | 40 | 40 | 40 |
| Breakdown strength (MPa) | 1.1 | 1.1 | 1.2 | 1.0 |
| Surface hardness (pts) | 85 | 86 | 86 | 85 |
| Durability | | | | |
| Slip resistance µwet | | | | |
| Initial value | 0.45 | 0.48 | 0.46 | 0.44 |
| 480,000 times of tire passage after 200-hr Xe irradiation | 0.44 | 0.45 | 0.45 | 0.42 |
| 960,000 times of tire passage after 400-hr Xe irradiation | 0.43 | 0.43 | 0.44 | 0.41 |
| Abrasion resistance | | | | |
| 960,000 times of tire passage after 400-hr Xe irradiation | ⊚ | ⊚ | ⊚ | ⊚ |

TABLE 2

| | Example | | Comparative Example | |
|---|---|---|---|---|
| | 5 | 6 | 1 | 2 |
| Ingredients | | | | |
| Elastic aggregates A (Elongated fiber-like rubber chips) | | | | |
| Average length (mm) | 6 | 6 | 6 | 6 |
| Average particle diameter (mm) | 1.0 | 1.0 | 1.0 | 1.0 |
| Hard aggregates B | | | | |
| Average particle diameter (mm) | 1.5 | 2.0 | 0.1 | 2.5 |
| Volume % based on A | 45 | 45 | 45 | 45 |
| Binder | | | | |
| Volume % based on A + B | 20 | 20 | 20 | 20 |
| Void content (%) | 40 | 40 | 40 | 40 |
| Breakdown strength (MPa) | 0.9 | 0.9 | 1.1 | 0.8 |
| Surface hardness (pts) | 84 | 83 | 88 | 85 |
| Durability | | | | |
| Slip resistance µwet | | | | |
| Initial value | 0.41 | 0.38 | 0.50 | 0.33 |
| 480,000 times of tire passage after 200-hr Xe irradiation | 0.38 | 0.36 | 0.37 | 0.31 |
| 960,000 times of tire passage after 400-hr Xe irradiation | 0.37 | 0.35 | 0.30 | 0.28 |
| Abrasion resistance | | | | |
| 960,000 times of tire passage after 400-hr Xe irradiation | ⊚ | ⊚ | ○ | ⊚ |

TABLE 3

| | Example | | Comparative Example | |
|---|---|---|---|---|
| | 7 | 8 | 3 | 4 |
| Ingredients | | | | |
| Elastic aggregates A (Elongated fiber-like rubber chips) | | | | |
| Average length (mm) | 6 | 6 | 6 | 6 |
| Average particle diameter (mm) | 1.0 | 1.0 | 1.0 | 1.0 |
| Hard aggregates B | | | | |
| Average particle diameter (mm) | 0.7 | 0.7 | 0.7 | 0.7 |
| Volume % based on A | 25 | 65 | 20 | 70 |
| Binder | | | | |
| Volume % based on A + B | 20 | 20 | 20 | 20 |
| Void content (%) | 40 | 40 | 40 | 40 |
| Breakdown strength (MPa) | 1.1 | 0.7 | 1.1 | 0.5 |
| Surface hardness (pts) | 81 | 89 | 80 | 92 |
| Durability | | | | |
| Slip resistance µwet | | | | |
| Initial value | 0.40 | 0.52 | 0.37 | 0.55 |
| 480,000 times of tire passage after 200-hr Xe irradiation | 0.37 | 0.50 | 0.35 | 0.51 |
| 960,000 times of tire passage after 400-hr Xe irradiation | 0.37 | 0.49 | 0.32 | 0.50 |
| Abrasion resistance | | | | |
| 960,000 times of tire passage after 400-hr Xe irradiation | ⊚ | ⊚ | ⊚ | ⊚ |

TABLE 4

| | Example | |
|---|---|---|
| | 9 | 10 |
| Ingredients | | |
| Elastic aggregates A (Elongated fiber-like rubber chips) | | |
| Average length (mm) | 15 | 25 |
| Average particle diameter (mm) | 1.8 | 2.0 |
| Hard aggregates B | | |
| Average particle diameter (mm) | 0.7 | 0.7 |
| Volume % based on A | 45 | 45 |
| Binder | | |
| Volume % based on A + B | 20 | 20 |
| Void content (%) | 40 | 40 |
| Breakdown strength (MPa) | 1.2 | 1.0 |
| Surface hardness (pts) | 85 | 85 |
| Durability | | |
| Slip resistance μwet | | |
| Initial value | 0.45 | 0.46 |
| 480,000 times of tire passage after 200-hr Xe irradiation | 0.44 | 0.43 |
| 960,000 times of tire passage after 400-hr Xe irradiation | 0.43 | 0.43 |
| Abrasion resistance | | |
| 960,000 times of tire passage after 400-hr Xe irradiation | ◎ | ◎ |

TABLE 5

| | Example | |
|---|---|---|
| | 11 | 12 |
| Ingredients | | |
| Elastic aggregates A (Granular rubber chips) | | |
| Average particle diameter (mm) | 2.5 | 4.5 |
| Hard aggregates B | | |
| Average particle diameter (mm) | 0.7 | 0.7 |
| Volume % based on A | 45 | 45 |
| Binder | | |
| Volume % based on A + B | 15 | 15 |
| Void content (%) | 37 | 37 |
| Breakdown strength (MPa) | 0.8 | 0.7 |
| Surface hardness (pts) | 85 | 85 |
| Durability | | |
| Slip resistance μwet | | |
| Initial value | 0.46 | 0.45 |
| 480,000 times of tire passage after 200-hr Xe irradiation | 0.42 | 0.43 |
| 960,000 times of tire passage after 400-hr Xe irradiation | 0.42 | 0.42 |
| Abrasion resistance | | |
| 960,000 times of tire passage after 400-hr Xe irradiation | ○ | ○ |

As can be understood from the above results, the porous elastic pavement materials of Examples each contained the hard aggregates having a predetermined average particle diameter in a predetermined proportion based on the elastic aggregates and, therefore, were excellent in durability with a smaller change in slip friction coefficient (μwet) with time. Further, the pavement materials of Examples were excellent in the other evaluated physical properties. On the contrary, the porous elastic pavement materials of Comparative Examples were each significantly inferior in some of the evaluated physical properties and, therefore, had some problems in practical applications.

The inventive porous elastic pavement material is applicable not only to roads such as driveways but also to pedestrian malls, athletic fields and the like.

What is claimed is:

1. A porous elastic pavement material comprising elastic aggregates, hard aggregates, and a binder which binds the elastic aggregates and the hard aggregates, wherein the hard aggregates have an average particle diameter of 0.2 to 2 mm, and are present in a proportion of 25 to 65 vol % based on the elastic aggregates;
    wherein hard aggregates are defined as aggregates that exhibit a greater hardness than the elastic aggregates.

2. A porous elastic pavement material as set forth in claim 1, wherein the average particle diameter of the hard aggregates is 0.5 to 2 mm.

3. A porous elastic pavement material as set forth in claim 2, wherein the average particle diameter of the hard aggregates is not less than one fifth an average particle diameter of the elastic aggregates.

4. A porous elastic pavement material as set forth in claim 2, wherein the elastic aggregates each have an elongated shape.

5. A porous elastic pavement material as set forth in claim 1, wherein the average particle diameter of the hard aggregates is not less than one fifth an average particle diameter of the elastic aggregates.

6. A porous elastic pavement material as set forth in claim 1, wherein the elastic aggregates each have an elongated shape.

* * * * *